(12) United States Patent
Paradis et al.

(10) Patent No.: US 6,340,033 B2
(45) Date of Patent: Jan. 22, 2002

(54) TRANSFER OF SHEAR-THINNING SLURRIES

(75) Inventors: Ronald Paradis; Donald L. Puxley, both of Jonquière (CA)

(73) Assignee: Alcan International Limited, Montreal (CA)

( * ) Notice: Subject to any disclaimer, the term of this patent is extended or adjusted under 35 U.S.C. 154(b) by 0 days.

(21) Appl. No.: 09/268,276

(22) Filed: Mar. 15, 1999

(51) Int. Cl.[7] .................................................. B05C 5/00
(52) U.S. Cl. ........................ 137/563; 366/136; 239/127; 222/318
(58) Field of Search .......................... 137/563; 366/136, 366/137; 118/404; 427/345; 239/127; 222/318

(56) References Cited

U.S. PATENT DOCUMENTS

| 3,685,654 A | | 8/1972 | MacLellan et al. | |
|---|---|---|---|---|
| 3,776,525 A | | 12/1973 | Warner | |
| 3,881,654 A | * | 5/1975 | Larkin | 239/127 |
| 4,040,954 A | | 8/1977 | Chandler | |
| 4,327,759 A | * | 5/1982 | Millis | 137/563 X |
| 4,471,916 A | | 9/1984 | Donaldson et al. | |
| 4,684,551 A | * | 8/1987 | Vassiliou | 427/345 |
| 4,778,115 A | | 10/1988 | Burnside et al. | |
| 4,830,507 A | | 5/1989 | Bagatto et al. | |
| 5,080,803 A | | 1/1992 | Bagatto et al. | |
| 5,188,739 A | | 2/1993 | Khan et al. | |
| 5,188,740 A | | 2/1993 | Khan | |
| 5,407,561 A | | 4/1995 | Ida et al. | |
| 5,445,674 A | * | 8/1995 | DeMars | 137/563 X |
| 5,447,369 A | * | 9/1995 | Boxall | 366/136 |
| 5,485,941 A | * | 1/1996 | Guyomard et al. | 222/318 X |
| 5,718,510 A | | 2/1998 | Farmery et al. | |

FOREIGN PATENT DOCUMENTS

| DE | 4201949 A1 | 7/1993 |
|---|---|---|
| WO | WO9727923 | 8/1997 |

* cited by examiner

Primary Examiner—John Rivell
(74) Attorney, Agent, or Firm—Cooper & Dunham LLP

(57) ABSTRACT

A method of and apparatus for removing a slurry having shear-thinning visco-plastic rheological properties from a reservoir containing a body of the slurry of such high viscosity that removal is impractical by conventional means, such as gravity flow or suction. The method comprises creating a flow of shear-thinned slurry in a submerged region of the body of slurry to entrain adjacent slurry of high viscosity, and then transferring some of the reduced viscosity slurry from the reservoir. The flow of shear-thinned slurry may be produced by withdrawing slurry from an outlet point in a region of the body of slurry to create a flow of withdrawn slurry, subjecting the flow of withdrawn slurry to shear conditions to form a withdrawn slurry of reduced apparent viscosity, and introducing the withdrawn slurry of reduced apparent viscosity into the region of the body at an inlet point therein spaced from the outlet point, the inlet and outlet points in the region being positioned relative to each other to create a flow or stream of slurry of reduced apparent viscosity through the region carrying therewith slurry of higher viscosity, and removing some of the slurry withdrawn from the region permanently from the reservoir. The apparatus provides conduits and a shear-generating device communicating with the reservoir and an outlet conduit for slurry permanently withdrawn from the reservoir.

24 Claims, 2 Drawing Sheets

TRANSFER OF SHEAR-THINNING SLURRIES

BACKGROUND OF THE INVENTION

This invention relates to high solids concentration slurries showing shear-thinning visco-plastic Theological properties and, more specifically, to a process and apparatus which allows for improved transfer of such thick, high solids content slurries or mud from a reservoir to a conduit or any other transportation device.

A large number of industrial processes generate solids residues which normally have to be washed and transported to disposal sites or to other recycling processes. The most common method used in industry to transport these solids residues is to slurry them in a carrying medium, water being the most commonly used medium, and to pump them to the desired destination. If the slurry is sufficiently concentrated, other means of transfer, such as belt conveyors, can also be used. It is important and most desirable, from an economical point of view, to operate with slurries of the highest solids concentration possible. This keeps the total amount of material to be handled, and eventually to be disposed of, to a minimum. When washing is necessary, a high solids content allows a maximum washing efficiency in the minimum number of washing stages. Finally, maximizing the solids content of a slurry has a favorable impact on the environment by reducing the total amount of material at the disposal site and reduces the risk of spillage and leakage of liquid effluents.

Achieving a high solids concentration from a dilute slurry can be done in numerous ways, the most common ones being by means of filtration, hydrocyclone, centrifuge, flotation, magnetic separation or gravity settler also called decanter or thickener. Each of these methods is capable of producing, to various degrees, a slurry of sufficiently high concentration that the thickened slurry or resulting mud will behave as a paste or a compacted cake. If the solids concentration achieved is very high and a relatively dry cake is formed, conventional dry transportation systems, such as belt or screw conveyors can be used. This is the case, for example, when a high efficiency vacuum filter or a pressure filter, such as a plate and frame type filter, is used. The high capital, operating and maintenance cost of these filters constitute, on the other hand, a major drawback.

The introduction of synthetic flocculants for the improvement of the performance of settlers/thickeners (Chandler, U.S. Pat. No. 4,040,954) and the development of high efficiency thickeners, such as the ones described by Bagatto et al. (U.S. Pat. Nos. 4,830,507 and 5,080,803) and by Farmery et al. (U.S. Pat. No. 5,718,510) have led to a generation of equipment capable of producing, directly in a gravity thickener, very high solids content slurries or muds which exhibit paste-like behavior.

These new settlers are limited, however, in performance by the need to maintain an underflow solids concentration which is low enough to ensure evacuation of the mud or thick slurry from the equipment. This underflow solids concentration is normally continuously monitored in order to avoid situations which would result in a severe blockage and, in many instances, the necessity to empty the reservoir by external means.

The use of positive displacement pumps to transport the material away from the thickening equipment to an appropriate disposal site can also be a limitation to the maximum solids concentration which can be tolerated in use. Although such pumps have, in principle, the capacity to transport very high solids slurries from the pressure side of the pump, the mud must be sufficiently fluid to be introduced continuously into the pump on the suction side.

Khan et al. (U.S. Pat. Nos. 5,188,739 and 5,188,740) have described a process by which a sanitary sewage sludge mixed with carbonaceous material is fed at a relatively high solids concentration into a reactor. This is achieved, as Khan et al. describe it in their patents, by the action of a pump which reduces the viscosity of the sludge by its shearing effect. In the Khan et al. patents, the material is fed directly from a centrifuge to a pump and is sufficiently fluid to be evacuated from the thickening equipment. Khan et al.'s objective is to have a material fluid enough to enter into a subsequent reactor. However, the Khan patents do not address the problem of getting the slurry into the pump in the first place.

In summary, therefore, the difficulty of handling and transferring high viscosity slurries has limited the attempts to maximize the solids contents of such slurries, and has therefore limited the advantages that the formation of such slurries could offer.

BRIEF SUMMARY OF THE INVENTION

An object of the invention is to make it possible to transfer high viscosity slurries from containers with reliability and consistency.

Another object of the invention is to facilitate transfer of high viscosity slurries, thus allowing thickening equipment to be used more efficiently and effectively.

Yet another object of the present invention, at least in its preferred forms, is to provide a method of, and apparatus for, moving slurries out of reservoirs or equipment such as, but not exclusively, deep thickeners and high efficiency settlers, so that such slurries may be transferred from the equipment in which they are formed or held to destinations where they may be used, treated or discarded. Such movement may be possible when the slurries are very thick, and have paste-like consistency exhibiting shear thinning visco-plastic rheological properties (non-Newtonian fluids).

According to one aspect of the invention, there is provided a method of removing a slurry having shear-thinning visco-plastic properties from a reservoir holding a body of the slurry, the slurry having a viscosity so high that direct withdrawal of a flow of the slurry from the reservoir is difficult, the method comprising: creating a submerged region of shear-thinned slurry of reduced viscosity in the body of slurry for entraining adjacent slurry of the high viscosity; and removing from the reservoir a portion of the slurry of reduced viscosity containing entrained slurry of high viscosity. The stream of shear-thinned slurry is preferably created by withdrawing slurry temporarily from the submerged region via an outlet to form a flow of withdrawn slurry, subjecting the withdrawn slurry to shear to produce a flow of shear-thinned slurry of reduced viscosity, and returning the shear-thinned slurry of reduced viscosity to the submerged region of the body via an inlet spaced from the outlet, thereby creating a flow of slurry between the inlet and the outlet. This withdrawal, shear application and return is preferably carried out continuously, at least during the period when slurry is to be transferred from the reservoir.

According to another aspect of the invention, there is provided apparatus for holding and delivering a slurry having a viscosity so high that direct withdrawal of a flow of the slurry from a reservoir holding a body of the slurry is difficult, the apparatus comprising: a reservoir for holding a body of the slurry; means for creating a submerged region of slurry of reduced viscosity in the body to entrain adjacent slurry of the high viscosity; and means for removing from the reservoir a portion of the slurry of reduced viscosity containing entrained slurry of high viscosity. The apparatus preferably comprises a first conduit having an inlet in the reservoir for withdrawing slurry from the submerged region, shear generating means communicating with the first conduit for subjecting withdrawn slurry from the first conduit to shear, a second conduit communicating with the shear generating means, having an outlet in the reservoir, for returning shear-thinned slurry of reduced viscosity from the shear generating means to the submerged region of the body, the inlet and the outlet being spaced from each other in the region, thereby creating the stream between the inlet and the outlet.

The invention may be used with any slurry having the required shear-thinning visco-plastic Theological properties. Slurries derived from all common mineral tailings (e.g. red mud from bauxite, tailings from zinc, copper, gold, iron ore and platinum extractions, and residues from tar sands, calcium tailings, etc.), so the invention is of particular application to such slurries. The invention is also particularly suited for use on a continuous, semi-batch or batch basis (but most especially a continuous basis) in combination with (e.g. is the same vessel as) slurry thickeners or concentrators of the type discussed above.

By the term "shear-thinning visco-plastic rheological properties" used herein to describe a slurry, we mean a thixotropic slurry having a viscosity that is reduced when the slurry is subjected to mechanical shear compared to the viscosity when the slurry is formed and remains undisturbed. The slurry with which the invention is used is generally of such high solids content that it has the properties of a paste that is difficult to remove from a reservoir by conventional methods. Basically, the invention relates to any slurry of the above kind that can be made to flow suitably for removal from a reservoir under suction when subjected to shear.

By the term "shear" we mean a force applied to the slurry that causes mixing or turbulence sufficient to reduce the apparent viscosity of a shear-thinning slurry. Shear varies in absolute terms according to various factors, including the apparent viscosity of the mixture. It is more meaningful, therefore, to use the property "yield stress" do define the force required to mix the slurry. Yield stress is the force required to commence mixing to the degree required to cause shear-thinning. The invention may require the application of fairly high yield stress, e.g. in the range of 50 to 1,000 Pa.

The invention is based on the discovery that by creating a flow or stream of slurry of reduced apparent viscosity within a submerged region of a slurry of high apparent viscosity held in a reservoir, the high shear slurry can be entrained within the flow of slurry of reduced viscosity, and thereby be caused to flow and to be removed from the reservoir. Slurry of high viscosity may then move downwards to replace the slurry thus removed, and so a constant slurry transfer from the reservoir may be achieved. The flow or stream of low viscosity slurry may be created by re-circulating a shear-thinning slurry (frequently referred to hereinafter by the term of art "mud") through a high-shear device, such as a pump, so that the apparent viscosity of the mud is greatly reduced, and this "remolded" mud can then act as a carrier for conveying unsheared (unremolded) higher viscosity mud to the high shear device or permanently out of the apparatus.

In this preferred form of the invention, the pump or other high shear device is believed to operate by breaking bonds formed between the solids particles of the mud, including the network formed by the flocculating agent and possibly the polymer itself (normally present in such muds if produced by slurry thickeners), which contributes to the lowering of the viscosity and the yield stress of the system. The breaking of the bonds may have the effect of releasing bound water, and the released water may act as a diluent or lubricant that reduces the apparent viscosity of the mud. The remolded lower viscosity mud, which is then re-circulated through a region of the reservoir, mixes with higher viscosity mud in its immediate vicinity and entrains it, e.g. by dissolving the higher viscosity mud or by physically entraining parts of it. The pressure exerted by the column of mud above the mixing region pushes material of higher viscosity down, filling the void created by the mud swept out of the reservoir by the re-circulating low viscosity mud which acts as a carrier. In this way, a continuous, downward movement of otherwise high viscosity, quasi-static bed of mud, is established. The amount of mud moving down in the reservoir is equivalent to the amount of mud which is withdrawn from the reservoir, e.g. via a branch conduit communicating with one of the mud recirculation conduits or exiting a side of the reservoir near the region containing the remolded mud.

In an especially preferred form, the invention involves providing an outlet (hereinafter referred to as a suction point) situated on the reservoir (on the tank wall or actually within the tank) in a region where the slurry is approximately at the desired consistency (usually at the bottom end of the reservoir), and providing a conduit (referred to as the suction conduit) of relatively short length (e.g. 30 meters or less) to connect this suction point to the suction port of a pump (or other high shear generating device), and providing another (similarly short) conduit (referred to as the discharge conduit) which connects the discharge port of the pump to another point on the reservoir (called the discharge point), this discharge point being located preferably at a short distance (e.g. between 0.2 and about 10 meters) from the suction point. The pump keeps in re-circulation a less viscous, remolded mud. A branch conduit is preferably provided communicating with either the suction conduit or the discharge conduit to transfer part of the remolded mud either to a transfer pump, to any other transportation device such as a belt or a screw conveyor. The branch conduit can alternatively be located on a wall of the reservoir (or within the reservoir) in the vicinity of the remolded mud Alternatively, the recirculation pump may also serve as the transfer pump.

In another preferred aspect of the present invention, to an arrangement similar to the one described above, a low shear stirrer of any form or shape can be incorporated into the reservoir to further reduce the viscosity of the mud and further break the solids bonds and flocculated network in the vicinity of the path of the re-circulating mud, i.e. in the region located between the suction point and the discharge point. Preferably, this low shear stirrer is a slow-moving mechanical device, such as, for instance, a rake or any other device to introduce additional shear and assist in moving the thick largely unsheared slurry towards and through the suction point in the reservoir. In the case of a rotational device, the term "low shear" preferably means a device having a rotational speed of about 0.01 to 5 rpm.

A preferred location to install the suction and discharge points is at the bottom section of a reservoir, such as a thickener or a settler. It can also be installed at the bottom section of an hydrocyclone or other equipment of similar geometry.

The power requirement of the re-circulation device is a function of the equivalent suction and discharge pipe dimension, the mass flow, the apparent viscosity of the slurry, the efficiency of the pump or other shearing device. In practice, there is a maximum distance between the suction and discharge points in the tank that should preferably be maintained for efficient operation. This maximum distance is function of the apparent viscosity of the recirculation mud between the two points. The maximum distance is dictated by efficiency of transportation of the low viscosity mud between these two points. This maximum efficient distance is normally in the order of 10 meters. On the other hand, If this distance is too short, the thick mud above may have a tendency to create a bridge over the space between the two points and block the downward movement of unremolded mud. Distances as small as 0.2 meters have been found effective. The suction and the discharge point can be placed at any angle of each other.

In the case where a low shear stirrer is provided, a convenient method of installation is to have a central support to which stirring elements are connected.

The ratio of slurry re-circulated over the net amount of mud evacuated can vary from 0.25 to 10:1 depending on the apparent viscosity of the mud after shearing. The higher the final apparent viscosity of the remolded mud, the higher this ratio may be.

DETAILED DESCRIPTION OF THE INVENTION

Figure 1:
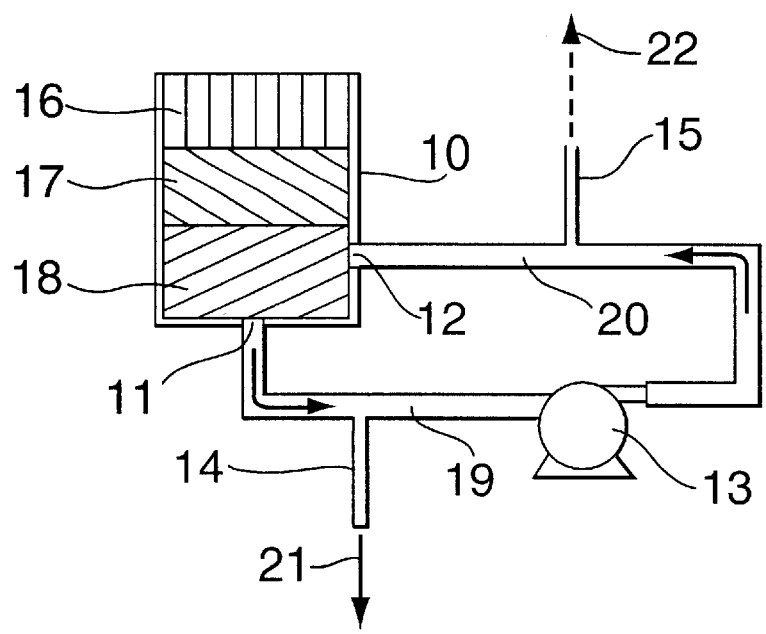
FIG. 1 is a cross-section of a reservoir containing high viscosity mud, and a schematic view of one form of the re-circulation system of the present invention.

FIG. 1 shows a cross section of a portion of a reservoir 10 containing various layers of mud 16, 17 and 18 and having two openings in a bottom region of the reservoir, one being a suction point 11 forming a mud (slurry) outlet and the other one being a discharge point 12 forming a mud inlet. The mud 18 located in a submerged (below other mud 17, 18 in the reservoir) region between these two points is re-circulated by a pump 13 via a suction conduit 19 and a discharge conduit 20, as withdrawn mud of reduced apparent viscosity (created by the high shear effect of the pump 13). This mud of reduced apparent viscosity forms a flow moving generally from the discharge point 12 to the suction point 11, and this flow creates the submerged region of reduced viscosity. As the mud of the region 18 moves generally from the inlet to the outlet, it mixes with adjacent high apparent viscosity unsheared mud 17 located in its immediate vicinity. A mixing zone is therefore created within the body of mud that may become more extensive in volume as mud continues to be recirculated. The exact nature of the entrainment of the high viscosity mud by the reduced viscosity mud is not precisely known. It may take the form of actual dissolving of the high viscosity mud within the reduced viscosity mud, or it may take the form of physical embedding, or the like.

In any event, the flow of reduced viscosity mud carries away some of the mud of high viscosity while still maintaining pumpable fluidity.

A portion of the high viscosity mud 17 is thus entrained with the remolded mud 18, and will be transferred out of the reservoir 10 together with the entraining mud of reduced apparent viscosity. Some of the mud of low apparent viscosity entraining mud of high apparent viscosity is transferred out of the apparatus completely (i.e. permanently) either through a branch pipe 14 or a branch pipe 15, as chosen by the operator, and will end up as transferred mud 21 or 22. Alternatively, the mud transferred permanently from the apparatus may be taken directly from the submerged region by an outlet conduit (not shown) having an inlet in a wall of the reservoir 10 adjacent to the mud 18, or projecting fully through the wall of the reservoir and terminating at an inlet positioned within the body of mud 18. The mud may be removed in this way because of its reduced apparent viscosity in this region. A portion of high viscosity mud 17 and 16 positioned above the re-circulated mud is then pushed downward under the pressure exerted by its own weight and/or by any other pressure applied (e.g. elevated air pressure applied to the headspace of the reservoir—not shown), to fill the void created by the mud which is evacuated. In the absence of applied pressure, the height of the column of high viscosity mud 16 above the submerged recirculation zone should preferably be sufficient to achieve an efficient downward motion of this mud to replace mud transferred permanently from the apparatus. This height varies from mud to mud, particularly if the high viscosity changes from mud to mud, and can be determined by simple trial and experiment. In general, however, the region 18 of low apparent viscosity(between the mud inlet and outlet) should preferably be submerged beneath the upper surface of the mud of high apparent viscosity by a minimum distance of about 0.3 m, and more preferably at least 1 m, in order to ensure effective entrainment of the high viscosity mud within the mud of reduced apparent viscosity over a prolonged period of time.

The apparatus may be operated continuously, with the amount of mud withdrawn permanently from the reservoir equaling the amount of mud introduced into the reservoir. The ratio of mud permanently removed to that recirculated through the reservoir depends on the respective diameters of the various conduits, and to some extent on the speed of recirculation produced by the pump 13. A variable speed pump may be employed, in order to provide a degree of control over this ratio, particularly when muds of different kinds or viscosities are to be used in the apparatus.

When the apparatus forms part of a mud thickener, the recirculation can be started when thickening of the mud first commences. In this case, the first mud introduced into the thickener will be quite dilute and will flow easily through the conduits and pump. The mud will then gradually thicken, but will be moved continuously through the circuit since the shear-thinning effect will reduce the apparent viscosity of the mud being recirculated. If the operation has to be stopped and restarted, there is no problem because the mud in the conduits and pump has a toothpaste-like consistency and does not settle. Upon pump startup, the paste is squeezed through the conduits and recirculation commences without difficulty. There is no need to purge the pump and conduits.

Figure 2:
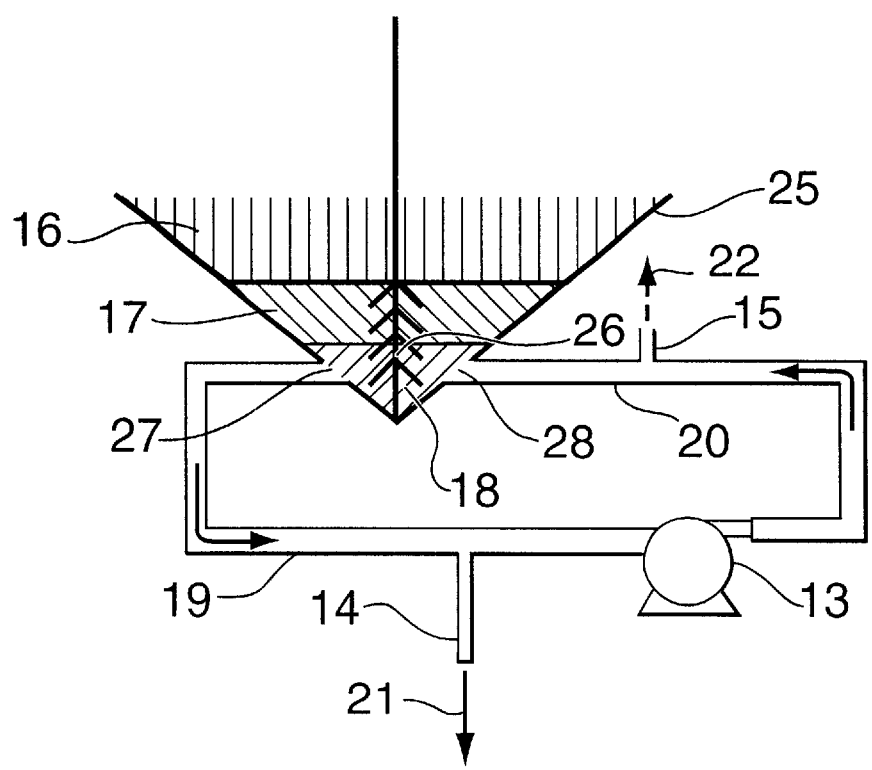
FIG. 2 is a cross-section of a an inverted conical bottom portion of a reservoir containing high viscosity mud, equipped with a low shear stirrer, and a schematic view of the re-circulation system.

FIG. 2 shows a cross section of a portion of a reservoir 25 containing various layers of mud 16, 17 and 18 and having two openings, one being a suction point 27 and the other one being a discharge point 28 and equipped with a low shear stirrer 26. The system essentially operates in the same manner as the one described in FIG. 1 with the added feature of the low shear stirrer which further reduces the viscosity of the mud in the region located between the suction point and the discharge point.

In reality, the mud zones labeled 17 and 18 need not be physically sharply defined zones as they are shown in FIGS. 1 and 2.

Typically the slurry corresponding to the layer 16 in the drawings can have a yield stress of the order of up to 500 Pa, although slurries of higher yield stress may be treated in some cases. The yield stress is the minimum amount of energy or stress required to initiate the displacement of a system, such as a slurry, which exhibits non-Newtonian viscosity behavior.

The re-circulation pump 13 provides mechanical shearing of the mud and hence modifies the physical properties of the paste-like slurry by decreasing its apparent viscosity. In the case of concentrating equipment such as thickeners and even hydrocyclones using synthetic flocculants, the pump also reduces the negative effect of these flocculants on the slurry viscosity by partially or completely destroying the long polymer chains and breaking the flocs. Although any type of pump supplying sufficiently high shear is adequate, a centrifugal pump has been found to be especially capable of providing the shear required to achieve the remolding of the mud that acts as the carrier.

Figure 3:
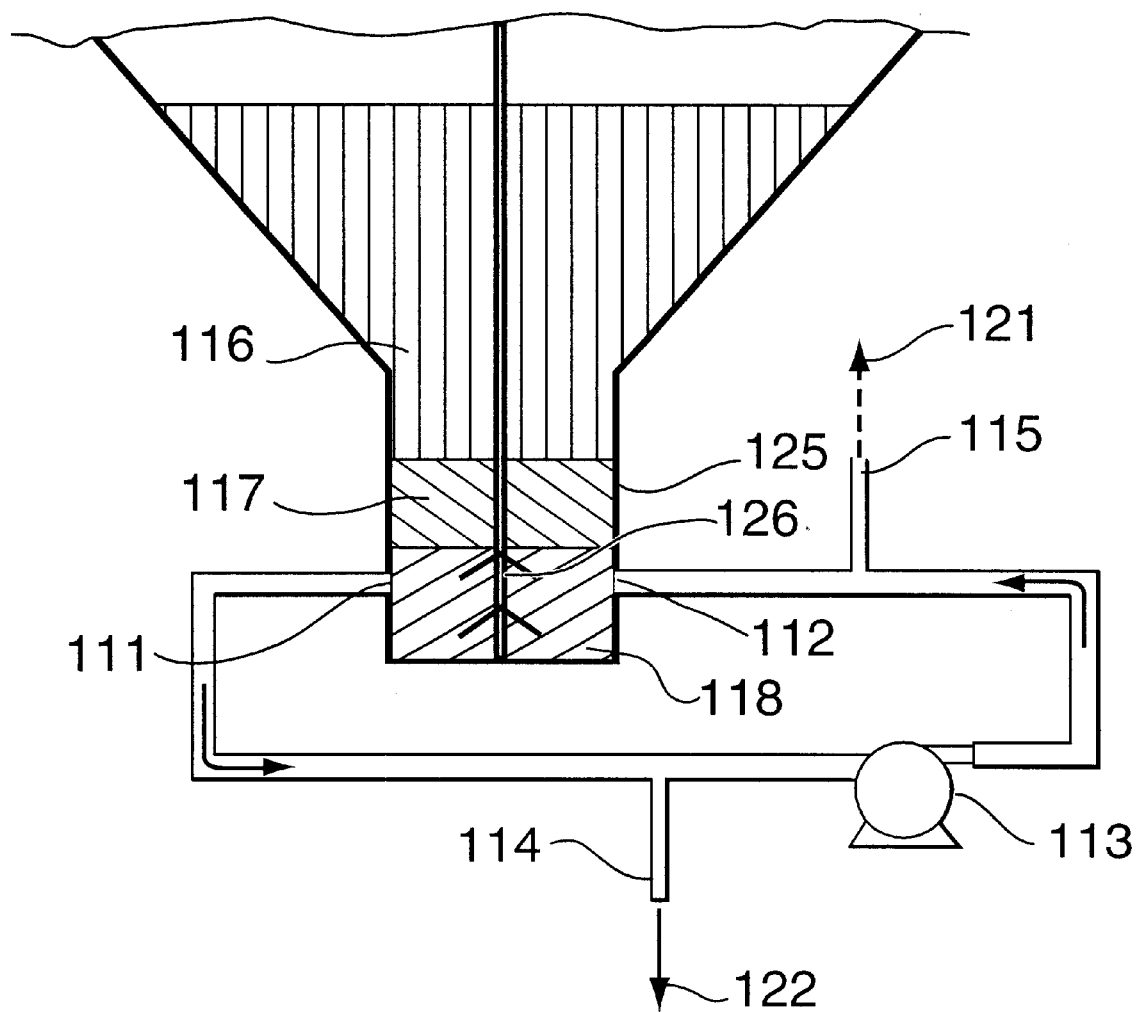
FIG. 3 is a cross-section of a reservoir having a conical shape in one of its section and having a cylindrical portion in its bottom section, containing high viscosity mud, equipped with a low shear stirrer, and a schematic view of the re-circulation system.

FIG. 3 shows a cross section of a portion of a reservoir 125 containing various layers of mud 116, 117 and 1 18 and having two openings, one being a suction point 127 (mud outlet) and the other one being a discharge point 128 (mud inlet) and equipped with a low shear stirrer 126. This reservoir 125 differentiates itself from the one in FIG. 2 in that the bottom section is a truncated inverted cone with a cylindrical portion at its very end. The system essentially operates in the same manner as the one described in FIG. 1 with the added feature of the low shear stirrer 126 which further reduces the viscosity of the mud in the region located between the suction point and the discharge point.

In reality, the mud zones labeled 16, 17 and 18 need not be physically sharply defined zones as they are shown in FIGS. 1 and 2 and 116, 117 and 118 of FIG. 3.

EXAMPLES

Example 1

A red mud slurry, resulting from the digestion of a mixture of 25% African and 75% Brazilian bauxite was fed to a high capacity thickener. The solids concentration at the underflow of the thickener reached approximately 53% by weight and the yield stress was of the order of 400 Pa. This mud was difficult to remove from the base of the thickener and the suction side of a positive displacement pump located a few meters away could not be adequately fed. By the introduction of a re-circulation system as shown in FIG. 2, the yield stress measured in the re-circulation loop was reduced to 100–120 Pa and the material could be continuously withdrawn from the thickener. The positive displacement pump fed with this remolded mud operated without difficulty. All yield stress measurements were carried out by rotary viscometry.

Example 2

A thickener vessel used to settle red mud of a composition similar to the one described in Example 1 above was limited to underflow concentration of 38 to 40% solids for consistent operation and to avoid frequent blockages of the outlet of the thickener. A recirculation system was installed on the vessel and the unit was able to operate without interruption at concentration of the order of 52 to 55% solids.

Example 3

In a cylindrical vessel having an internal diameter of 7.62 cm, the bottom section of which was coupled to a recirculating pump and a high shear device as illustrated in U.S. Pat. No. 5,616,831 was filled with a slurry of red mud which after settling reached a solids concentration of 55% sollids. The yield stress measured for this slurry after settling was 485 Pa. When the pump was turned on, the mud could not be taken out of the cylinder through the pipe connecting to the pump.

The test was repeated again with fresh slurry of the same initial concentration but this time, as the mud was let to settle, the underflow flow pump and the in-lineagitator were started and the slurry was re-injected at the base of the cylinder containing the slurry. The solids after few hours of settling achieved a concentration 54.7% and the yield stress measured on this remolded slurry was 48 Pa. The mud contained in the cylinder was then completely removed through a branched pipe attached to the conduit recirculating the mud back to the base of the cylinder Although the above Examples have been carried out mainly on red mud, which is the residue of the digestion of bauxite, the same basic principle has been applied to other residues such as copper and various calcium salts with similar results. Although the percentage solids in the slurry will vary with the nature of the mud, the method proposed in this invention will greatly improve the transfer of the thick slurry out of the reservoir when the slurry has a shear thinning visco-plastic behavior and preferably the initial yield stress is not above about 500 Pa. This is the case for mining residues such as zinc, gold, iron ore or platinum tailings and tar sands residues to name a few that have been tested for their rheological properties.

Example 4

A copper tailing slurry was fed to a high capacity deep thickener. The solids concentration measured was approximately 68% solids by weight and yield stress was such that the tailing slurry would not flow by gravity from the thickener to a floor trench. The yield stress was measured in the field using a modified version of the cement slump test using a cylinder 100 mm in diameter by 200 mm in height. In a slump test, the larger the diameter measured is, the less viscous the material is. In term of yield stress this would translate into a lower yield stress for higher slump value. The measured slump from the thickener was 130 mm. By using a recirculation system such as the one illustrated in FIG. 2, the "slump" was reduced to 165 mm and the slurry could be discharged through a controlled valve into the floor trench and to a disposal site nearby.

What we claim is:

1. A method of removing a slurry of mineral tailings having shear-thinning visco-plastic properties from a reservoir holding a body of said slurry, said slurry having a viscosity so high that direct withdrawal of a flow of said slurry from said reservoir is difficult, said method comprising:

thickening a fluid slurry in a reservoir to form said body of slurry having a viscosity so high that direct withdrawal of a flow of said slurry from said reservoir is difficult;

creating a submerged region of shear-thinned slurry of reduced viscosity in said body of slurry beneath the slurry of high viscosity for entraining adjacent slurry of said high viscosity by withdrawing slurry temporalily from said lower part of said reservoir via an outlet to form a flow of withdrawn slurry, subjecting said withdrawn slurry to shear to produce a flow of shear-thinned slurry of reduced viscosity of at least 50 Pa to said reservoir via an inlet spaced from said outlet, thereby creating a flow of slurry between the inlet and said outlet sufficient to entrain a portion of said slurry of high viscosity: and removing from said reservoir a portion of said slurry of reduced viscosity containing entrained slurry of high viscosity.

2. The method of claim 1, wherein said portion of slurry of reduced viscosity containing entrained slurry of high viscosity is removed directly from said submerged region in said body of slurry.

3. The method of claim 1, wherein said portion of slurry of reduced viscosity containing entrained slurry of high viscosity is removed from said flow of withdrawn slurry prior to return of said flow of withdrawn slurry to said submerged region via said inlet.

4. The method of claim 1, wherein said shear to which said withdrawn slurry is subjected is in the range of 50 to 1000 Pa.

5. The method of claim 1, wherein said shear-thinned slurry of reduced viscosity has a viscosity in the range of 50 to 500 Pa.

6. The method of claim 1, wherein a ratio of said withdrawn slurry re-introduced into said submerged region as shear-thinned slurry via said inlet to said portion of slurry removed from said reservoir is in the range of 0.25 to 10:1.

7. The method of claim 1, wherein slurry in said submerged is stirred.

8. The method of claim 7, wherein said slurry is stirred by a rotating device at low shear in the range of 0.05 to 5 rpm.

9. The method of claim 1, wherein said submerged region of said body is a region adjacent a lower end of said reservoir.

10. The method of claim 1, wherein said outlet and said inlet are spaced from each other by a distance within the range of 0.2 to 10 m.

11. The method of claim 1, wherein said reservoir acts as a slurry thickener to increase a solids content of slurry introduced into said reservoir as said slurry progresses through said reservoir towards a lower end thereof, and wherein said stream of shear-thinned slurry of reduced viscosity is created in said submerged region positioned adjacent to said lower end of the reservoir.

12. The method of claim 11, wherein said slurry thickener is operated continuously and said portion of slurry of reduced viscosity containing entrained slurry of high viscosity is removed continuously from said reservoir.

13. The method of claim 1, wherein said body of slurry is pressurized.

14. A method of removing a slurry having shear-thinning visco-plastic properties from a reservoir holding a body of said slurry, said slurry having a viscosity so high that direct withdrawal of a flow of said slurry from said reservoir is difficult, said method comprising:

creating a submerged region of shear-thinned slurry of reduced viscosity in said body of slurry beneath the slurry of high viscosity for entraining adjacent slurry of said high viscosity by withdrawing slurry temporarily from said lower part of said reservoir via an outlet to form a flow of withdrawn slurry, subjecting said withdrawn slurry to shear to produce a flow of shear-thinned slurry of reduced viscosity to said reservoir via an inlet spaced from said outlet, thereby creating a flow of slurry between said inlet and said outlet sufficient to entrain a portion of said slurry of high viscosity; and removing from said reservoir a portion of said slurry of reduced viscosity containing entrained slurry of high viscosity;

wherein said portion of slurry of reduced viscosity containing entrained slurry of high viscosity is removed from said flow of withdrawn slurry prior to subjecting said flow of withdrawn slurry to said shear.

15. A thickener apparatus for forming, holding and delivering a slurry of mineral tailings having a viscosity so high that direct withdrawal of a flow of said slurry from a reservoir holding a body of said slurry is difficult, said apparatus comprising:

a reservoir for holding a fluid slurry and for thickening said fluid slurry to form a body of slurry having a viscosity so high that direct withdrawal of a flow of said slurry from said reservoir holding a body of said slurry is difficult;

a shear generator for creating a submerged region of slurry of reduced viscosity in said body beneath the slurry of high viscosity to entrain adjacent slurry of said high viscosity;

a first conduit having an inlet in said reservoir for withdrawing slurry from said submerged region, said shear generator communicating with said first conduit for subjecting withdrawn slurry from said first conduit to shear suitable to impart a reduced viscosity of at least 50 Pa to said withdrawn slurry, and a second conduit communicating with said shear generator, having an outlet in said reservoir, for returning shear-thinned slurry of said reduced viscosity from said shear generator to said submerged region of said body, said inlet and said outlet being spaced from each other in said region, thereby creating said flow of slurry between said inlet and said outlet sufficient to entrain a portion of said slurry of high viscosity.

16. The apparatus of claim 15, wherein said slurry remover comprises a third conduit communicating with said first conduit.

17. The apparatus of claim 15, wherein said slurry remover comprises a third conduit communicating with said second conduit.

18. The apparatus of claim 15, wherein said shear generator is a fluid pump.

19. The apparatus of claim 15, further including a conveying device for conveying away from said reservoir said portion of slurry removed therefrom.

20. The apparatus of claim 19, wherein said shear generator functions as said conveying device.

21. The apparatus of claim 15, further comprising a slurry stirrer positioned in said reservoir in said submerged region.

22. The apparatus of claim 15, wherein said reservoir operates as a slurry thickener.

23. The apparatus of claim 22, wherein said slurry thickener operates continuously.

24. The apparatus according to claim 18, wherein said outlet and said inlet are spaced from each other by a distance within the range of 0.2 to 10 meters.

* * * * *